(12) United States Patent
Sauvignet et al.

(10) Patent No.: US 8,454,831 B2
(45) Date of Patent: Jun. 4, 2013

(54) BIOLOGICAL AND BALLASETD FLOCCULATION TREATMENT OF WASTEWATER

(75) Inventors: Phillippe Sauvignet, Saint-Etienne-en-Cogles (FR); Kashi Banerjee, Moon Township, PA (US); Charles D. Blumenschein, Pittsburgh, PA (US)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 296 days.

(21) Appl. No.: 13/042,652

(22) Filed: Mar. 8, 2011

(65) Prior Publication Data

US 2011/0147304 A1  Jun. 23, 2011

Related U.S. Application Data

(63) Continuation-in-part of application No. 12/091,849, filed as application No. PCT/EP2006/067679 on Oct. 23, 2006, now abandoned.

(30) Foreign Application Priority Data

Oct. 28, 2005 (FR) ..................... 05 11084
Nov. 17, 2005 (FR) ..................... 05 11669

(51) Int. Cl.
  *C02F 3/06* (2006.01)
  *C02F 3/08* (2006.01)
  *C02F 1/52* (2006.01)

(52) U.S. Cl.
  CPC . *C02F 3/06* (2013.01); *C02F 3/082* (2013.01); *C02F 3/085* (2013.01); *C02F 1/52* (2013.01); *C02F 1/5236* (2013.01)
  USPC ........... 210/616; 210/617; 210/619; 210/631; 210/711; 210/713; 210/714

(58) Field of Classification Search
  USPC ............... 210/615, 616, 617, 619, 631, 150, 210/151, 195.3, 202, 709, 710, 711, 712, 210/713, 714
  See application file for complete search history.

(56) References Cited

U.S. PATENT DOCUMENTS

| | | | |
|---|---|---|---|
| 3,976,568 A | 8/1976 | Torpey | |
| 4,721,570 A | 1/1988 | Ankaitis | |
| 4,927,543 A * | 5/1990 | Bablon et al. | 210/711 |
| 5,192,441 A * | 3/1993 | Sibony et al. | 210/151 |
| 6,679,993 B1 * | 1/2004 | Charuckyj et al. | 210/616 |
| 7,153,431 B2 * | 12/2006 | Daugherty | 210/622 |
| 2006/0000771 A1 * | 1/2006 | Gaid et al. | 210/616 |

FOREIGN PATENT DOCUMENTS

| | | |
|---|---|---|
| CN | 1310136 A | 8/2009 |
| FR | 2403306 A1 | 4/1979 |
| FR | 2547574 A1 | 12/1984 |
| FR | 2719235 A1 | 11/1995 |
| WO | 88/01608 A1 | 3/1988 |
| WO | 89/01357 A1 | 2/1989 |
| WO | 03/020650 A1 | 3/2003 |

* cited by examiner

*Primary Examiner* — Christopher Upton
(74) *Attorney, Agent, or Firm* — Coats & Bennett, P.L.L.C.

(57) ABSTRACT

A method for treating wastewater comprises biologically treating the wastewater in a fixed-biomass biological reactor and then treating the wastewater in a ballasted flocculation system. The ballasted flocculation system produces a clarified effluent and sludge containing inert granular material having biomass accumulated thereon and suspended solids. The inert granular material having biomass accumulated thereon is separated from the suspended solids and then cleaned with a cleaning solution. After separating the biomass from the cleaned inert granular material, the cleaned inert granular material is recycled for use in the ballasted flocculation system.

28 Claims, 3 Drawing Sheets ated from the suspended solids and the biomass, the ballast is recycled for use in the ballasted flocculation system.

According to other exemplary embodiments of the present invention, wastewater is biologically treated in a fixed-biomass biological reactor followed by treatment in a ballasted flocculation system. After treatment in the ballasted flocculation system, the wastewater contains sludge comprising suspended solids and ballast having biomass accumulated thereon.

The ballast is separated from the suspended solids in the sludge and then mixed with a cleaning solution in a primary cleaning system. The cleaning solution removes excess biomass from the ballast. The detached biomass, cleaning solution, and cleaned ballast are directed to a secondary cleaning system where the cleaned ballast is separated from the detached biomass and cleaning solution. The cleaned ballast is recycled for use in the ballasted flocculation system while the detached biomass and cleaning solution are recycled to the primary cleaning system.

BIOLOGICAL AND BALLASETD FLOCCULATION TREATMENT OF WASTEWATER

CROSS-REFERENCE TO RELATED APPLICATIONS

This application is a continuation-in-part of U.S. patent application Ser. No. 12/091,849 which is a U.S. National Stage application of PCT Application No. PCT/EP2006/067679, with an international filing date of Oct. 23, 2006. Priority is claimed based on French application serial no. 05 11084 filed Oct. 28, 2005 and French application serial no. 05 11669 filed Nov. 17, 2005. All priority applications are expressly incorporated herein.

TECHNICAL FIELD

The invention relates to wastewater treatment in a biological reactor followed by clarification in a ballasted flocculation system. The invention involves cleaning the ballast used in the ballasted flocculation system.

BACKGROUND

Wastewater containing both dissolved and suspended solids often requires both biological treatment and clarification. Dissolved contaminants in the wastewater can be removed through biological treatment while suspended solids are generally removed through clarification. During the biological treatment, wastewater flows through a reactor containing biomass. In a fixed-biomass biological reactor, bacteria or biomass is fixed onto a support media. As the media is circulated through the wastewater, the biomass on the media digest dissolved solids in the wastewater. After biological treatment, the wastewater is clarified in a flocculation and clarification system. Typically, some of the biomass from the biological reactor sloughs off the media and flows with the biologically treated wastewater to the flocculation and clarification system. When the wastewater is treated with a ballasted flocculation process, the excess biomass often attaches onto the ballast that has been added to the wastewater. However, the excess biomass attached onto the ballast is difficult to remove in conventional separation systems. Thus, when the ballast is recirculated for use in the ballasted flocculation system, the excess biomass remains attached to the ballast. Over time, the continued growth of biomass on the ballast imparts a sticky residue thereto and decreases the efficiency of the ballast in the ballasted flocculation tank. Accordingly, there is a need for effective removal of biomass from the ballast prior to reusing the ballast in the ballasted flocculation system.

SUMMARY

According to exemplary embodiments of the present invention, wastewater is biologically treated in a fixed-biomass biological reactor followed by treatment in a ballasted flocculation system. In the ballasted flocculation system, a ballast and a flocculant are mixed with the wastewater which cause the suspended solids in the wastewater to agglomerate around the ballast. In addition, biomass present in the wastewater also attaches onto the ballast. The ballast having accumulated biomass thereon and the suspended solids form sludge that settles, leaving clarified water. The ballast is then separated from the suspended solids and cleaned to remove the biomass accumulated thereon. After the ballast is sepa-

BRIEF DESCRIPTION OF THE DRAWINGS

Other features and advantages of the present invention will become apparent from the following detailed description, taken in conjunction with the accompanying drawings, which illustrate, by way of example, the principles of the invention.

DETAILED DESCRIPTION

Figure 1:
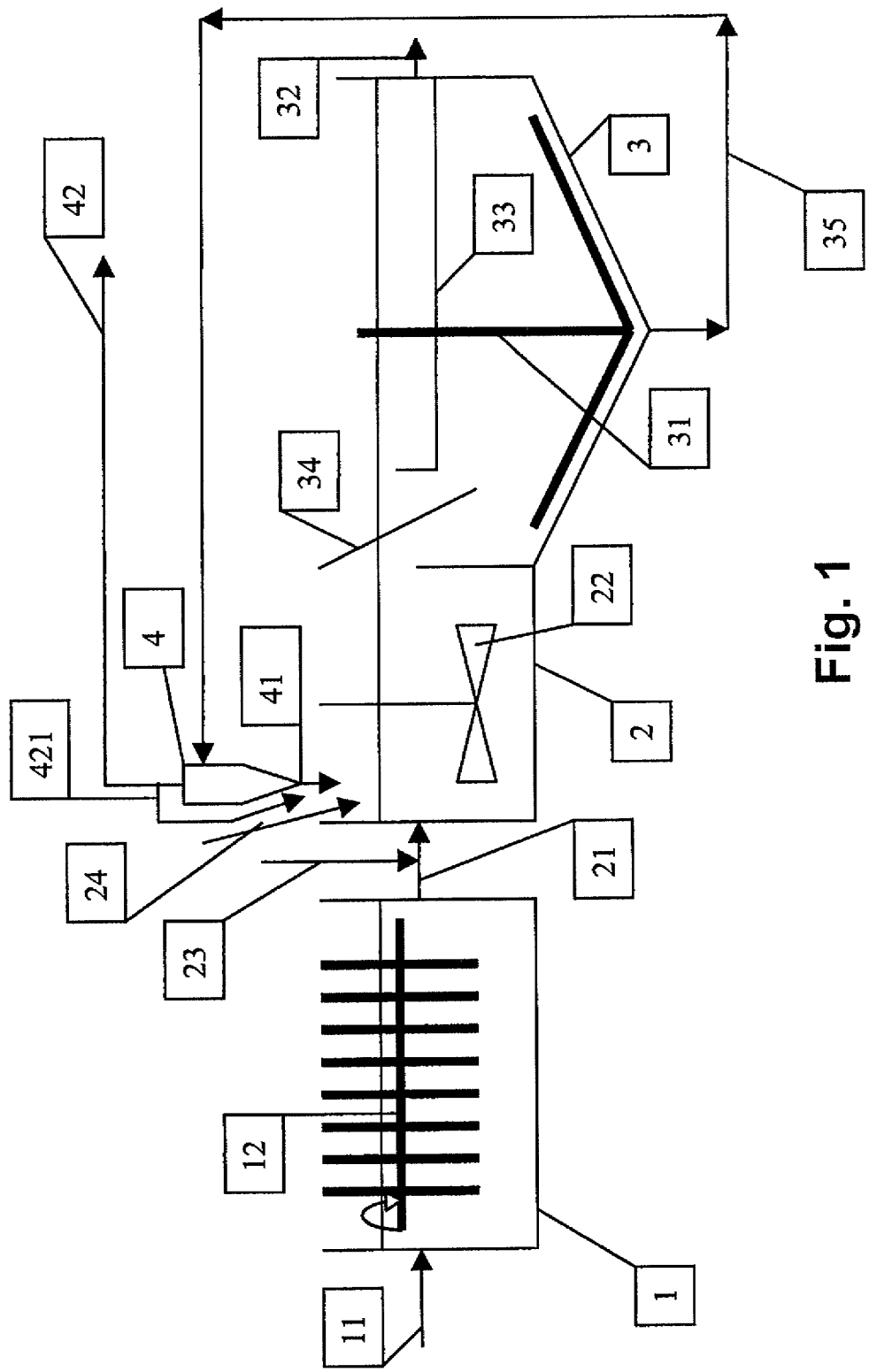
FIG. 1 is a schematic diagram of an exemplary method for treating wastewater in a biological reactor followed by a ballasted flocculation system.

The present invention includes treating wastewater in a fixed-biomass biological reactor followed by a ballasted flocculation system. Dissolved contaminants in the wastewater are removed through biological treatment while suspended solids are removed in the ballasted flocculation system.

As used herein, the term "wastewater" refers to any stream of water containing an undesirable contaminant including byproducts of environmental, industrial, and municipal processes. In addition, the term "wastewater" encompasses a contaminated stream of water suited for treatment to produce potable water or drinking water.

As the wastewater flows into the biological reactor, it is treated with biomass. The biomass may be fixed onto any support or carrier that allows the biomass to contact the contaminants in the wastewater. For example, the biomass may be fixed onto a bacterial bed, a moving bed biological reactor (MBBR), a biofilter, or a biological disc. The carriers provide a support onto which microorganism grow. As the microorganisms grow on the carriers, a bio-film is formed over the surfaces of the carriers that removes certain contaminants from the wastewater. The wastewater may be aerated or oxygenated to support aerobic biological processes in the biological reactor. Typically some of the biomass from the biological reactor sloughs off the media and into the wastewater.

After biological treatment, the wastewater is treated in a ballasted flocculation system. In the ballasted flocculation system, a ballast, coagulant, and flocculant are mixed with the wastewater. The coagulant destabilizes the suspended solids in the wastewater, while the flocculant promotes the agglomeration of the destabilized suspended solids around the ballast to form flocs. The excess biomass in the wastewater can also attach onto and grow on the ballast in the wastewater.

The wastewater containing flocs is then directed to a settling zone where the flocs settle in the form of sludge, leaving clarified effluent. In some embodiments, the settling zone includes lamellas that promote the settling of the flocs. The settled sludge is pumped to a separator that separates the ballast from other contaminants in the sludge. A portion of the separated ballast can be recirculated to the ballasted flocculation system. A relatively small portion of the separated sludge may also be recirculated to the ballasted flocculation system while the remaining sludge is sent for further treatment. Recirculating a portion of the sludge to the ballasted flocculation system, along with the use of a proper coagulant in the ballasted flocculation system, promotes the elimination of phosphorus in the wastewater. However, because the majority of the sludge is not recirculated to the ballasted flocculation system, the wastewater contains less suspended solids than in conventional flocculation processes using return activated sludge.

Generally, conventional separators are not effective in removing all the biomass attached onto the ballast. Thus, the ballast separated from the sludge in the separator generally still has some biomass attached thereto. To remove the biomass from the ballast, at least a portion of the ballast is sent from the separator to a cleaning system to remove the biomass from the ballast. Cleaning the ballast entails mixing a reagent with the ballast, mixing service water with the ballast, or mixing ozonated water with the ballast to remove biomass therefrom. The cleaned ballast can then be recirculated to the ballasted flocculation system.

In one embodiment, the cleaning system includes a primary cleaning system and a secondary cleaning system. In the primary cleaning system, the ballast is mixed with a cleaning solution which removes the biomass attached to the ballast. After cleaning, the cleaned ballast, excess biomass, and the cleaning solution are directed to a secondary cleaning system that separates the cleaned ballast from the excess biomass and cleaning solution. The cleaned ballast is then recirculated to the ballasted flocculation system, while the excess biomass and cleaning solution is sent for disposal and/or recirculated to the primary cleaning system. Monitors can be placed in either or both of the primary and secondary cleaning systems to monitor the concentration of the cleaning solution.

The below embodiments, along with the accompanying figures, provide a more detailed account of inventive processes described above.

In FIG. 1, wastewater influent enters a fixed-biomass biological reactor 1 through inlet 11. The fixed-biomass biological reactor 1 contains rotating biological contactors made of discs that rotate around a common axis 12. The biomass fixed to these contactors forms a film that removes dissolved contaminants in the wastewater as the wastewater passes through the contactors. Rotation of the discs provides the oxygen necessary for biological treatment.

After biological treatment in the fixed-biomass biological reactor 1, the wastewater generally contains less than 2 g/l of suspended solids, and preferably less than 1 g/l of suspended solids. The wastewater and the suspended solids therein flow from the biological reactor 1 through passage 21 and are directed to a ballasted flocculation system at a velocity gradient of between $10\ s^{-2}$ and $1000\ s^{-1}$.

In the ballasted flocculation system 2, the wastewater is mixed with a ballast, a coagulant, and a flocculant via mixer 22. As discussed in more detail below, the ballast is provided from the underflow 41 of hydrocyclone 4. The flocculant and coagulant are added to wastewater in the ballasted flocculation system 2 through inlets 24 and 23 respectively. As the wastewater is mixed with the ballast, coagulant, and flocculant, suspended solids in the wastewater agglomerate around the ballast and form ballasted flocs. Typically, the residence time of the wastewater in the ballasted flocculation system 2 is between 1 minute and 10 minutes, but is preferably less than 3 minutes.

The ballast added to the wastewater in the ballasted flocculation system can be any inert granular material that is denser than water. Preferably, however, the ballast is sand having dimensions between 40 µm and 300 µm. If the wastewater is being treated to produce potable or drinking water, it is preferable that the ballast have an average diameter of approximately 80 µm. Ballast having such a small diameter have a higher specific surface area and generally requires less flocculant polymer to produce ballasted flocs. Using a ballast having such a small diameter is generally easier to clean than a ballast having a large diameter because the ballast having a small diameter accumulates much less floc and biomass. The coagulant added to the wastewater can be either a metallic salt, such as iron chloride or aluminum chloride, or an organic compound such as polydiallyldimethylammonium (poly-DADMAC) chloride. Preferably, however, the coagulant is ferric chloride, $FeCl_3$, which removes residual phosphorus from the wastewater. Notably, since the $FeCl_3$ is added downstream from the biological reactor 1, it does not hinder the growth of the biomass therein. The flocculant added to the wastewater can be either an anionic or cationic polymer. Because the biologically wastewater generally contains less than 2 g/l of suspended solids, the amount of coagulant and flocculant needed in the ballasted flocculation system is reduced from conventional activated sludge processes.

The wastewater, along with the flocs, is directed from the ballasted flocculation system 2 through a baffle 34 to a settling zone 3 where the ballasted flocs settle away from the clarified water. The clarified water overflow is collected from the surface of the settling zone 3 through longitudinal chutes 33 which lead to clarified effluent channel 32. The settled ballasted flocs form sludge that is picked up by scraper 31 in the bottom of the settling zone 3. The sludge is then pumped through channel 35 to the hydrocyclone 4.

Hydrocyclone 4 separates the ballast from other contaminants in the sludge. Separated ballast, is denser than the other contaminants in the sludge, and thus, settles to the bottom of the hydrocyclone and exits through underflow 41. This ballast is then recirculated into the ballasted flocculation system 2. A portion of the sludge separated from the ballast in the hydrocyclone 4 is also recirculated to the ballasted flocculation system 2 through line 421, while the remaining sludge is sent through line 42 for additional treatment.

During experimental treatment using the above process, the wastewater contained less than 60 mg/l of suspended solids after biological treatment. The ballast used in the ballasted flocculation system 2 was sand having an effective diameter of 130 µm and a real density of 2.65 $g/m^3$. The coagulant used was a 50 mg/l solution of ferric chloride, $FeCl_3$, and the flocculant used was an anionic flocculant having a concentration of 1.5 mg/l. In the settling zone 3, the sludge settled at a mirror settling velocity of 30 m/h, where the mirror settling velocity is equal to the treated flow divided by the settling area. Using these parameters in the above described process, the clarified effluent contained less than 20 mg/l of suspended solids. Further, only 3 grams of sand per every cubic meter of water treated was lost.

Figure 2:
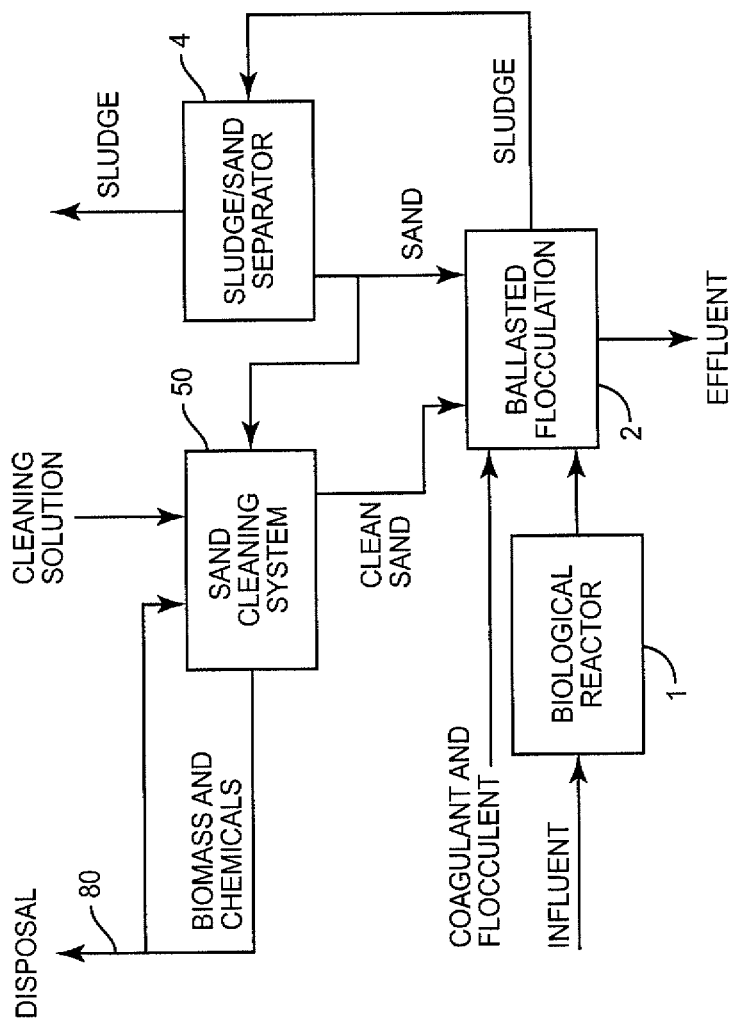
FIG. 2 is a schematic diagram of a simplified exemplary method for treating wastewater in a biological reactor followed by a ballasted flocculation system and cleaning the ballast used in the ballasted flocculation system.
Figure 3:
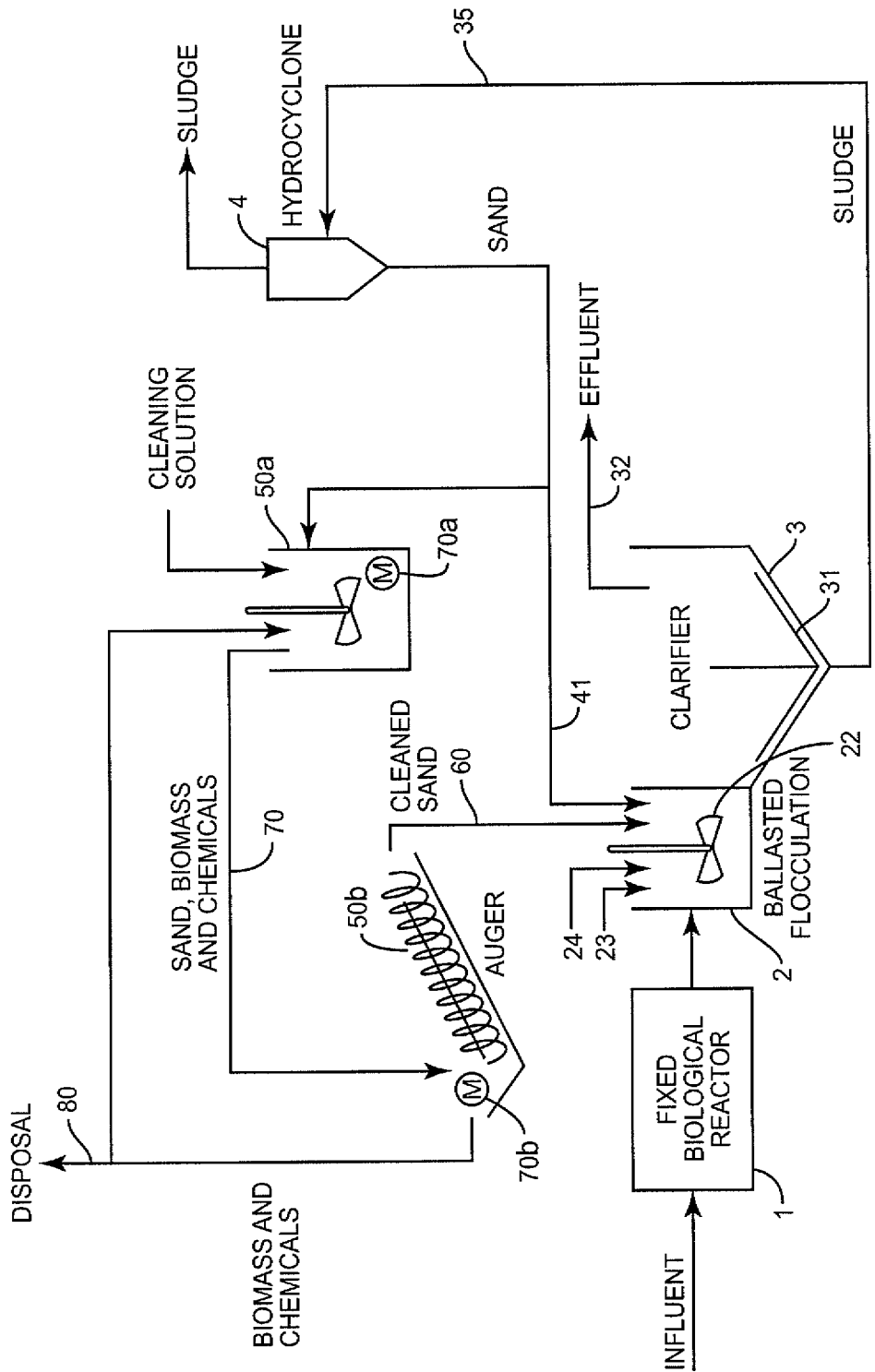
FIG. 3 is a schematic diagram of another exemplary method for treating wastewater in a biological reactor followed by a ballasted flocculation system and cleaning the ballast used in the ballasted flocculation system.

FIGS. 2 and 3 illustrate other embodiments of the invention in which the ballast used in the ballasted flocculation system is cleaned.

In FIG. 2, wastewater influent enters a biological reactor 1. The biological reactor 1 contains media that act as a support for biomass. In one embodiment, the media are rotating biological contactors. In one embodiment, the biomass is fixed to supports such as those produced by Anox-Kaldnes of Sweden. The biomass fixed to these supports forms a film that removes dissolved contaminants in the wastewater as the wastewater passes into contact with the support. However, other types of fixed biomass supports, as described above, can also be used. During biological treatment, some of the biomass is sloughed off the support or media and into the wastewater. The biologically treated wastewater and the excess biomass flow from the biological reactor 1 to ballasted flocculation system 2. As described above, because the wastewater is treated with fixed-biomass, the wastewater generally contains less than 2 g/l of suspended solids, and preferably less than 1 g/l of suspended solids. Further, in one embodiment, the wastewater and the suspended solids therein, including the excess biomass, flow from the biological reactor 1 to the ballasted flocculation system 2 at a velocity gradient of between $10\ s^{-2}$ and $1000\ s^{-1}$.

In the ballasted flocculation system 2, a ballast, coagulant, and flocculant are added to and mixed with the wastewater. The coagulant and the flocculant not only causes suspended solids in the wastewater to agglomerate around the ballast, but also causes some of the excess biomass in the water to attach onto the ballast. As described in the previous embodiment, the ballast added to the wastewater can be any inert granular material that is denser than water. Preferably, however, the ballast is sand. Further, the coagulant and flocculant added to the wastewater can be any of the previously mentioned coagulants and flocculants.

In the ballasted flocculation system 2, the ballast, the excess biomass, and the suspended solids, form flocs that settle leaving the clarified effluent. The settled flocs form sludge that is directed from the ballasted flocculation system 2 to a separator 4. Although the separator 4 separates the ballast from the sludge, the separator 4 generally does not remove all of the biomass attached to and growing on the ballast. Thus, at least a portion of the ballast having biomass attached thereto is directed from the separator 4 to a cleaning system 50, which removes biomass from the ballast. In one embodiment, a portion of the ballast is recirculated from the separator 4 back to the ballasted flocculation system 2 without being treated in the cleaning system 50.

In the cleaning system 50, a cleaning solution is mixed with the ballast. Upon contact, a reagent in the cleaning solution causes the biomass to detach from the ballast. The cleaned ballast is then separated from the detached biomass and cleaning solution. The separated cleaned ballast is directed from the cleaning system 50 and recirculated back to the ballasted flocculation system 2. At least a portion of the detached biomass and cleaning solution is recirculated to the cleaning system 50, while the remaining biomass and cleaning solution are sent to disposal 80.

In FIG. 3, the wastewater influent enters a biological reactor 1. As described above, the biological reactor contains biomass fixed onto media. During biological treatment, some of the biomass is sloughed off the media and into the wastewater. The biologically treated wastewater and the excess biomass flow from the biological reactor 1 to ballasted flocculation system 2 that may include multiple tanks. In one embodiment, the wastewater and the suspended solids therein, including the excess biomass, flow from the biological reactor 1 to the ballasted flocculation system 2 at a velocity gradient of between $10\ s^{-2}$ and $1000\ s^{-1}$.

Ballast, such as sand, is added to the ballasted flocculation system 2 through inlet 41 and mixed with the wastewater using a stirrer 22. As described in the previous embodiments, the ballast added to the wastewater can be any inert granular material that is denser than water. A coagulant and a flocculant are also added to the ballasted flocculation system 2 through inlets 23, 24 respectively, and mixed with the wastewater. As described above, the coagulant and the flocculant not only promote suspended solids in the wastewater to agglomerate around the ballast, but also promote excess biomass in the wastewater to attach onto the ballast and form flocs. The coagulant and flocculant added to the wastewater can be any of the previously mentioned coagulants and flocculants.

The treated wastewater containing ballasted flocs is then directed to a clarifier or settling tank 3 where the ballasted flocs settle away from the clarified effluent, which exits the clarifier 3 through channel 32. The settle flocs form sludge that is scraped off the bottom of the clarifier 3 with a scraper 31 and pumped through extraction channel 35 to a hydrocyclone 4.

Hydrocyclone 4 separates the ballast from the other contaminants in the sludge. However, the hydrocyclone 4 cannot typically remove all of the biomass from the ballast. Thus, at least a portion of the separated ballast having biomass attached thereto is directed from the hydrocyclone 4 to a primary cleaning system 50*a*, which removes biomass from the ballast. In one embodiment, a portion of the ballast is recirculated from the hydrocyclone 4 back to the ballasted flocculation system 2 without being treated in the primary cleaning system 50*a*. In one embodiment between approximately 5% and approximately 20% of the ballast separated from the sludge in the hydrocyclone 4 is directed to the primary cleaning system 50*a*. In another embodiment, up to 50% of the ballast from the hydrocyclone 4 is directed to the primary cleaning system 50*a*. A portion of the sludge separated from the ballast in the hydrocyclone 4 can also be recirculated to the ballasted flocculation system 2 while the remaining sludge separated from the ballast is sent for further treatment.

In the primary cleaning system 50*a*, a cleaning solution is mixed with the ballast to ensure thorough contact between the cleaning solution and the biomass. As the cleaning solution contacts the biomass on the ballast, the biomass detaches from the ballast. Numerous cleaning solutions that kill biomass can be used in the primary cleaning system 50*a*. For example, the cleaning solution may include acids, bases, or oxidizing agents. In a preferred embodiment, sodium hypochlorite, or bleach, is used in the cleaning solution. When sodium hypochlorite solution is used as the cleaning solution, a concentration of approximately 10 mg/l is effective to kill the biomass within approximately 5 minutes of mixing the solution with the ballast.

The overflow from the primary cleaning system 50*a* includes a mixture of cleaned ballast, detached biomass, and the cleaning solution, which is directed to a secondary cleaning system or tank 50*b*. In one embodiment the secondary cleaning system 50*b* includes an auger disposed along an inclined plane. The auger conveys the cleaned ballast along the inclined plane and separates the cleaned ballast from the detached biomass and cleaning solution. In another embodiment, the secondary cleaning system 50*b* includes a hydrocyclone that separates the cleaned ballast from the detached biomass and the cleaning solution. In either case, the cleaned ballast is recirculated from the secondary cleaning system 50b to the ballasted flocculation system 2 through line 60. At least a portion of the detached biomass and the cleaning solution separated from the cleaned ballast in the secondary cleaning system 50b is recirculated to the primary cleaning system 50a through line 70, while the remaining detached biomass and cleaning solution is sent to disposal 80. In one embodiment, approximately 90% of the biomass and cleaning solution from the secondary cleaning system is recirculated back to primary cleaning 50a while approximately 10% of the biomass and cleaning solution is sent to disposal.

The concentration of the cleaning solution can be monitored in primary cleaning system 50a and/or the secondary cleaning system to ensure that an effective concentration of the cleaning solution is present in the primary cleaning system 50a to remove biomass from the ballast, As shown in FIG. 3, the monitors 70a and 70b are placed in the primary and secondary cleaning devices respectively to monitor the concentration of the cleaning solution. If the concentration of the cleaning solution falls below a target value, the concentration of the cleaning solution added to the primary cleaning system 50a is increased.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A method for biologically treating wastewater, the method comprising:
    biologically treating the wastewater in a fixed-biomass biological reactor;
    directing the biologically treated wastewater to a ballasted flocculation system, and wherein a portion of the biomass from the biological reactor flows with the wastewater to the ballasted flocculation system;
    removing suspended solids from the wastewater by mixing the biologically treated wastewater with a ballast and a flocculant in the ballasted flocculation system to produce clarified wastewater and sludge, wherein the sludge contains suspended solids and the ballast having biomass accumulated thereon;
    separating the ballast having biomass accumulated thereon from the sludge;
    cleaning the ballast having biomass accumulated thereon by mixing the ballast with a cleaning solution;
    separating the cleaned ballast from the biomass; and
    recirculating the cleaned ballast to the ballasted flocculation system.

2. The method of claim 1 wherein cleaning the ballast comprises directing the ballast to a primary cleaning system and mixing the ballast with the cleaning solution in the primary cleaning system, wherein mixing the ballast with the cleaning solution causes the biomass to detach from the ballast.

3. The method of claim 2 further comprising directing the cleaned ballast, detached biomass, and cleaning solution from the primary cleaning system to a secondary cleaning system and separating the cleaned ballast from the biomass in the secondary cleaning system.

4. The method of claim 3 wherein the cleaning solution comprises hypochlorite and the method further comprises monitoring the concentration of the hypochlorite in the secondary cleaning system.

5. The method of claim 3 further comprising recirculating a portion of the detached biomass and cleaning solution from the secondary cleaning system to the primary cleaning system.

6. The method of claim 5 further comprising recirculating approximately 90% of the detached biomass and cleaning solution from the secondary cleaning system to the primary cleaning system.

7. The method of claim 2 wherein the cleaning solution comprises hypochlorite and the method further comprises monitoring the concentration of the hypochlorite in the primary cleaning system.

8. The method of claim 7 further comprising maintaining the hypochlorite in the primary cleaning system at a concentration of at least approximately 10 mg/L.

9. The method of claim 2 wherein the ballast having accumulated biomass thereon includes a first portion and a second portion and wherein the method further comprises recirculating a first portion of the separated ballast having biomass accumulated thereon to the ballasted flocculation system and directing the second portion of the separated ballast having biomass accumulated thereon to the primary cleaning system.

10. The method of claim 2 wherein between approximately 5% and approximately 20% of ballast separated from the sludge is directed to the primary cleaning system.

11. The method of claim 2 wherein approximately 50% of the ballast separated from the sludge is directed to the primary cleaning system.

12. The method of claim 1 wherein mixing the ballast with the cleaning solution occurs for at least 5 minutes.

13. The method of claim 1 wherein the cleaning solution includes hypochlorite.

14. The method of claim 1 wherein biologically treating the wastewater comprises biologically treating the wastewater with at least one bacterial bed, moving bed biological reactor, biofilter or biological disk.

15. The method of claim 1 further comprising directing the biologically treated wastewater from the biological reactor to the ballasted flocculation system at a velocity gradient of approximately 10 s$^{-1}$ to approximately 1000 s$^{-1}$.

16. The method of claim 1 wherein the cleaning solution includes service water or ozonated water.

17. The method of claim 1 wherein the method is utilized to treat drinking water and wherein the ballast comprises microsand having an average diameter of approximately 80 μm.

18. A method for treating wastewater comprising:
    biologically treating the wastewater in the fixed-biomass biological reactor;
    directing the biologically treated wastewater to a ballasted flocculation system, and wherein a portion of the biomass from the biological reactor flows with the wastewater to the ballasted flocculation system;
    removing suspended solids from the biologically treated wastewater in a ballasted flocculation system by mixing the wastewater with a ballast and a flocculant to produce clarified water and sludge, wherein the sludge contains suspended solids and the ballast having biomass accumulated thereon;
    separating the ballast having biomass accumulated thereon from the sludge;
    recirculating a first portion of the ballast having biomass accumulated thereon to the ballasted flocculation system;
    directing a second portion of the ballast having biomass accumulated thereon to a primary cleaning system;

cleaning the second portion of the ballast in the primary cleaning system by mixing the second portion of the ballast with a cleaning solution and causing the biomass to detach from the ballast;

collecting the detached biomass, cleaning solution, and the cleaned ballast in a secondary cleaning system;

separating the cleaned ballast from the detached biomass and cleaning solution in the secondary cleaning system; and recirculating the cleaned ballast from the secondary cleaning system to the ballasted flocculation system.

19. The method of claim 18 wherein the secondary cleaning system comprises an auger and wherein separating the cleaned ballast further comprises conveying the cleaned ballast through the secondary cleaning system with the auger.

20. The method of claim 18 wherein the secondary cleaning system comprises a hydrocyclone.

21. The method of claim 18 further comprising directing the biologically treated wastewater from the biological reactor to the ballasted flocculation system at a velocity gradient of approximately $10 \text{ s}^{-1}$ to approximately $1000 \text{ s}^{-1}$.

22. The method of claim 18 wherein the cleaning solution includes hypochlorite.

23. The method of claim 22 further comprising monitoring the concentration of the hypochlorite in the secondary cleaning system.

24. The method of claim 22 further comprising maintaining the hypochlorite in the primary cleaning system at a concentration of at least approximately 10 mg/L.

25. The method of claim 18 wherein between approximately 5% and approximately 20% of ballast separated from the sludge is directed to the primary cleaning system.

26. The method of claim 18 wherein approximately 50% of the ballast separated from the sludge is directed to the primary cleaning system.

27. The method of claim 18 further comprising recirculating approximately 90% of the detached biomass and cleaning solution from the secondary cleaning system to the primary cleaning system.

28. The method of claim 18 wherein biologically treating the wastewater comprises biologically treating the wastewater with at least one bacterial bed, moving bed biological reactor, biofilter or biological disk.

\* \* \* \* \*

UNITED STATES PATENT AND TRADEMARK OFFICE
CERTIFICATE OF CORRECTION

| | | |
|---|---|---|
| PATENT NO. | : 8,454,831 B2 | Page 1 of 1 |
| APPLICATION NO. | : 13/042652 | |
| DATED | : June 4, 2013 | |
| INVENTOR(S) | : Phillippe Sauvignet et al. | |

It is certified that error appears in the above-identified patent and that said Letters Patent is hereby corrected as shown below:

On the Title page and in the specification, Column 1, the title of the patent should read as follows:
-- BIOLOGICAL AND BALLASTED FLOCCULATION TREATMENT OF WASTEWATER --

Signed and Sealed this
Sixth Day of August, 2013

Teresa Stanek Rea
*Acting Director of the United States Patent and Trademark Office*